Dec. 8, 1931.  W. C. GUEST ET AL  1,835,039
LIQUID MEASURING APPARATUS
Filed July 19, 1928
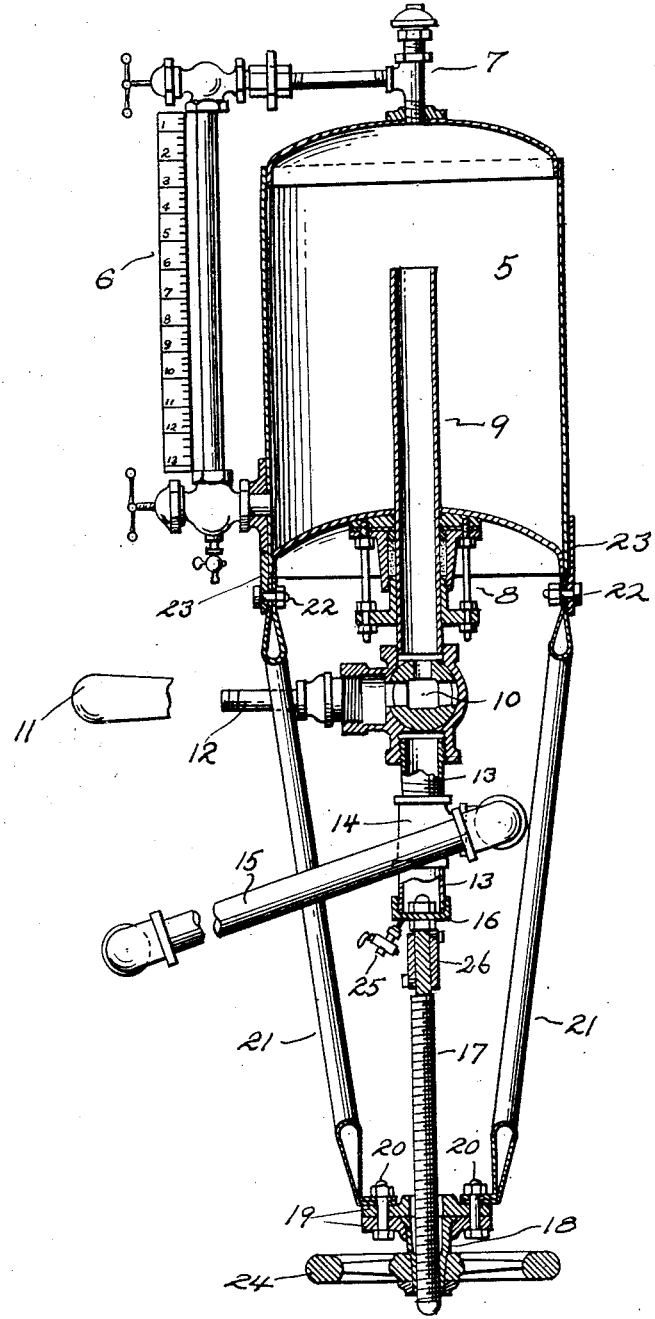
INVENTOR.
W. C. Guest and R. S. Pruitt
BY J. T. Newton,
ATTORNEY.

Patented Dec. 8, 1931

1,835,039

UNITED STATES PATENT OFFICE

WALTER C. GUEST AND RALPH S. PRUITT, OF ANDERSON, SOUTH CAROLINA

LIQUID MEASURING APPARATUS

Application filed July 19, 1928. Serial No. 293,977.

This invention relates to improvements in liquid-measuring apparatus particularly adapted for use in supplying concrete mixing machines with a predetermined quantity of water. In mixing concrete the quantity of water required varies according to the proportions of the materials used and to meet other conditions. One of the objects of the instant invention is to provide a measuring apparatus in which the capacity of the container can be easily adjusted so that a predetermined quantity of water can be uniformly supplied for successive charges of the mixing machine.

The invention consists in the novel construction, combination and arrangement of parts hereinafter described, pointed out in the appended claims, and illustrated by the accompanying drawing.

The figure in the drawing is a vertical sectional view of a liquid-measuring apparatus embodying the invention.

Referring to the drawing in detail, 5 designates a fixed cylindrical tank of sufficient capacity to contain the maximum quantity of liquid that may be required for a single discharge of the tank. Mounted on the tank is the combined gage 6 and vent 7, of known construction, to indicate the level of the liquid in the tank and to permit the flow of air from and to the tank as the liquid enters or discharges into and from the tank.

Mounted on the exterior of the concave bottom of the tank, at the central part thereof, is the stuffing-box 8 through which extends the single-tube nozzle 9 concentric with the axis of the tank. The nozzle is adjusted in the stuffing-box and its upper end opens within the tank. On the lower end of the nozzle, outside of the tank, is fixed the casing of the three-way valve 10 controlled by the handle 11. Communicating with two of the ports of the valve casing are the supply and discharge pipes 12 and 13, respectively.

The supply pipe 12 is adapted to be connected with a suitable source of liquid supply and in the discharge pipe 13 which is aligned with the nozzle 9, is interposed the T-coupling 14. Swivelled on the horizontal arm of the T-coupling is the dispensing pipe 15 adapted to be connected with a flexible pipe (not shown) that can be directed to a suitable place of discharge. The third port of the valve casing communicates with the nozzle 9.

By adjusting the three-way valve in its casing, communication can be established between the interior of the tank and either the supply pipe or the discharge pipe, or both communications can be closed. When the valve is turned to open communication between the tank and the supply pipe, as shown in the drawing, the communication to the discharge pipe is closed. As the tank fills with liquid, the air therein escapes through the vent and the level of the liquid is indicated by the gage; liquid escaping through the vent would also indicate that the tank is filled. When the tank is filled the valve is turned to close the supply communication and also to continue the closing of the discharge communication. To empty the tank, the valve is turned to open communication between the tank and the discharge pipe 13, the communication between the supply pipe 12 and the tank remaining closed.

Mechanism is provided for adjusting the nozzle 9 in the tank to determine the quantity of liquid to be discharged therefrom. Fixed on the lower end of the discharge pipe 13 is the cap 16, to which is clamped the upper end of the threaded rod 17 alined with the pipe 13 and the nozzle. This connection between the threaded rod 17 and the pipe 13 prevents rotation of the rod on its axis. Engaging the rod is the nut 18 rotatable in a bearing provided by the abutting plates 19 clamped together by the bolts 20.

The upper edge of the nut is provided with a flange that registers with a complementary recess between the plates, and holds the nut against longitudinal movement while it is rotated. The plates 19 are secured by the bolts 20 to the lower ends of the tubular hangers 21 positioned on opposite sides of the screw rod 17 and the connections of the latter. The upper ends of the hangers are secured by the bolts 22 to the brackets 23 welded to opposite sides of the tank. On the nut 18 is fixed the hand-wheel 24 for rotating the nut 18 in its bearing.

The stuffing-box 8 is of comparatively heavy construction and its base, welded to the bottom of the tank, has considerable area, to provide a substantial guide for the nozzle 9 in its movements in and out of the tank. The tubular hangers provide a rigid mounting for the bearing of the nut 18. The rigid mounting for the nut 18 and the substantial character of the stuffing-box 8 serve to maintain in alinement the nozzle, the nut and the intermediate connections, during the rotation of the nut and the movement of the discharge pipe 15.

The height of the upper orifice of the nozzle 9 within the tank determines the quantity of liquid to be discharged. When the maximum is required, the nozzle is adjusted to position its orifice to the lowermost level; if less quantities of liquid are required, the nozzle is adjusted to corresponding higher levels. In the operation of the apparatus, by turning the hand-wheel 24 in either direction the nut 18 is similarly rotated in the bearing provided by the plates 19, rigidly held by the tubular hangers 21. As the nut is held against vertical movement and as the screw rod is held against rotation, the engagement of the rod with the nut imparts to the former a vertical movement during the rotation of the latter. The rigid connection between the rod 17 and the nozzle 9, provided by the intermediate parts, transmits the vertical movement of the threaded rod to the nozzle so that the latter can be vertically adjusted as to the desired level of its orifice within the tank.

With the nozzle adjusted to the required level in the tank, the valve 10 is turned to open communication between the supply pipe 12 and the nozzle, as shown in the drawing. As the tank fills, the air therein escapes through the vent 7 and the progress of the filling can be observed in the gage 6. Also, flow of the liquid from the vent would indicate that the tank is filled. It may be stated here that the tank is completely filled, preliminary to a discharge of the liquid for mixing purposes. After the tank is filled, the valve is turned to cut off the supply and at the same time to maintain the closing of the discharge port of the valve casing. To discharge the tank for mixing purposes, the valve 10 is turned by the handle 11 to open the communication from the nozzle through the pipe 13, the T-coupling 14 and the swivelled pipe 15. While the discharge communication is open the supply communication is closed. With the discharge communication open, all the liquid in the tank above the level of nozzle orifice flows through the intermediate connections and the pipe 15 to the place of discharge, which may be the rotating cylinder of a mixing machine, previously loaded with concrete material. To drain the lower part of the pipe 13, a valve 25 is provided. To limit the downward movement of the screw rod 17, a sleeve 26 is secured on the upper end of the rod to engage the upper clamping plate 19. To indicate the height of the nozzle in the tank, graduations may be marked on the lower part of the nozzle to register with the face of the lower plate of the stuffing-box 8 to show the height of the nozzle within the tank. In the use of the device, the valve-controlled means for supplying and discharging the tank is operable independently of the means for adjusting the nozzle in the tank, so that when the nozzle is set for a predetermined measure of liquid for a discharge, no further adjustment of the nozzle is required until a different measure of liquid is required.

What we claim is:

1. In a liquid-measuring apparatus, the combination of a tank, with a vertical single-tube nozzle slidable through the bottom of the tank to project into the interior thereof, valve-controlled means communicating with the lower end of the nozzle and operable independently of the sliding movement of the nozzle to supply and to discharge liquid to and from the tank through the nozzle, a screw-rod connected with the lower end of the nozzle with the rod and nozzle in axial alinement, a rotatable nut engaging the screw-rod, and means providing a fixed bearing for the nut to permit rotation of the nut therein and to prevent movement of the nut in the direction of its axis, the rotation of the nut in its bearing operating to move the connected screw-rod and nozzle to adjust the latter in the tank to determine the lower level of the liquid in the tank.

2. In a liquid-measuring apparatus, the combination of a tank, with a vertical single-tube nozzle slidable through the bottom of the tank to project into the interior thereof, valve-controlled means communicating with the lower end of the nozzle and operable independently of the sliding movement of the nozzle to supply and to discharge liquid to and from the tank through the nozzle, a screw-rod connected with the lower end of the nozzle with the rod and nozzle in axial alinement, a rotatable nut engaging the screw-rod, and a rigid support mounted on the tank and including a bearing for the nut to permit the rotation of the nut and to prevent movement of the nut in the direction of its axis, the rotation of the nut in its bearing operating to move the connected screw-rod and nozzle to adjust the latter in the tank to determine the lower level of the liquid in the tank.

3. In a liquid-measuring apparatus, the combination of a tank, with a vertical single-tube nozzle slidable through the bottom of the tank to project into the interior thereof, valve-controlled means communicating with the lower end of the nozzle and operable independently of the sliding movement of the nozzle to supply and to discharge liquid to and from the tank through the nozzle, a screw-rod connected with the lower end of the nozzle with the rod and nozzle in axial alinement, a rotatable nut engaging the screw-rod and provided with a peripheral flange, abutting plates clamped together to form a bearing in which the nut is journaled with its flange engaged between the plates to prevent movement of the nut in the direction of its axis, and opposite hangers clamped at their respective ends to the tanks and to the bearing plates to maintain the plates in fixed offset relation to the bottom of the tank and the bearing in axial alinement with the connected screw-rod and nozzle, the rotation of the flanged nut in the bearing operating through the intervening mechanism to adjust the nozzle in the tank to determine the lower level of the liquid in the tank.

4. In a liquid-measuring apparatus, the combination of a tank, with a vertical single-tube nozzle slidable through the bottom of the tank to project into the interior thereof, a stuffing-box mounted on the bottom of the tank and providing a guideway for the nozzle to maintain the nozzle in upright position in the tank, a three-way valve including a casing with the lower end of the nozzle threaded in one of the ports of the casing, said valve being operable independently of the sliding movement of the nozzle, supply and discharge pipes respectively threaded in the other ports of the valve casing with the discharge pipe in axial alinement with the nozzle, a dispensing pipe swiveled to the discharge pipe, a screw-rod attached to the lower end of the discharge pipe with the rod and pipe in axial alinement, a rotatable nut engaging the screw-rod, and means providing a fixed bearing for the nut to permit rotation of the nut therein and to prevent movement of the nut in the direction of its axis, the rotation of the nut in its bearing operating to move the connected screw-rod and nozzle to adjust the latter in the tank to determine the lower level of the liquid in the tank.

5. In a liquid-measuring apparatus, the combination of a tank, with a single-tube nozzle vertically slidable through the bottom of the tank to project into the interior thereof, said nozzle being open only at its upper part to the interior of the tank, adjusting mechanism for vertically adjusting the nozzle in the tank to determine the lower level of liquid in the tank, said adjusting mechanism operating to maintain the previously adjusted nozzle in fixed relation of the tank to provide a uniform measure of the liquid discharged from the tank during such adjustment of the nozzle, and valve-controlled means mounted on the nozzle below the tank and communicating with the lower end of the nozzle to supply and to discharge liquid through the nozzle to and from the tank.

6. In a liquid-measuring apparatus, the combination of a tank, with a single-tube nozzle vertically slidable through the bottom of the tank to project into the interior thereof, said nozzle being open only at its upper part to the interior of the tank, adjusting mechanism for vertically adjusting the nozzle in the tank to determine the lower level of liquid in the tank, said adjusting mechanism operating to maintain the previously adjusted nozzle in fixed relation to the tank to provide a uniform measure of the liquid discharged from the tank during such adjustment of the nozzle, a three-way valve including a casing and a controlling element rotatable in the casing, said valve casing being fixed on the nozzle below the tank with one of its ports communicating with the lower end of the nozzle, and supply and discharge pipes respectively communicating with the other ports of the valve casing, said controlling element being rotatable in the casing to establish communication between the nozzle and either the supply pipe or the discharge pipe.

In testimony whereof we affix our signatures.

WALTER C. GUEST.
RALPH S. PRUITT.